Patented Oct. 20, 1953

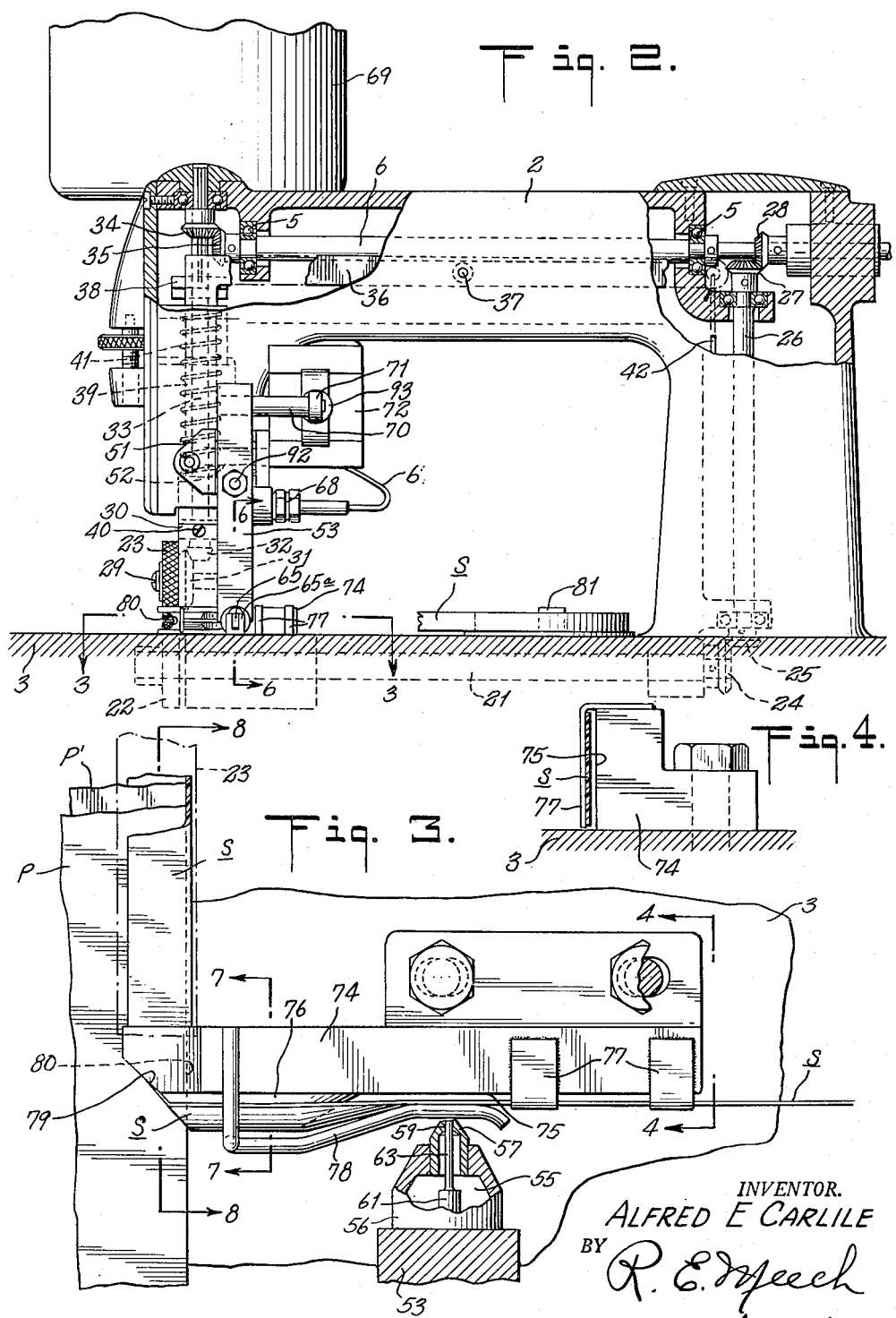

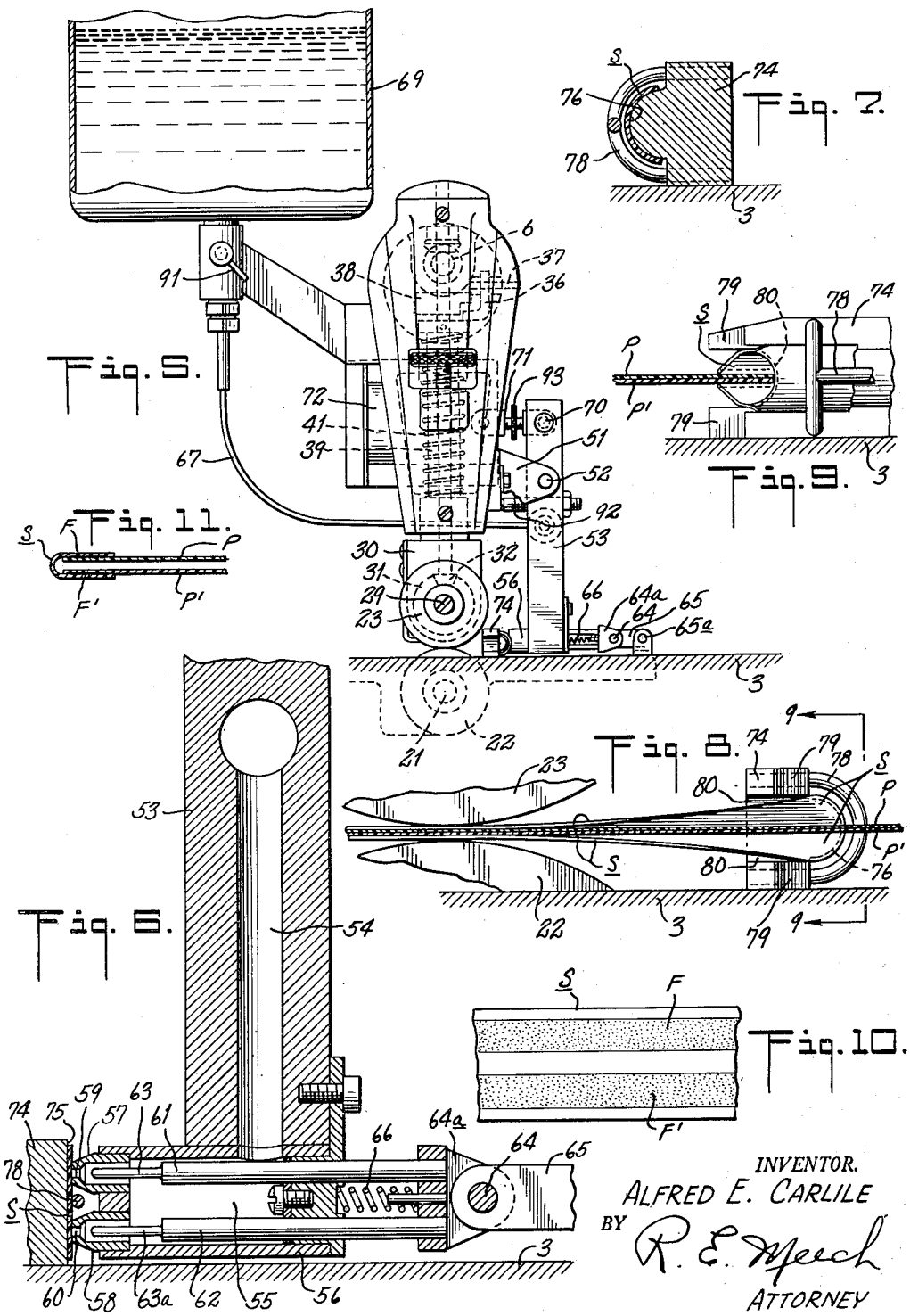

2,655,980

UNITED STATES PATENT OFFICE 2,655,980

BONDING MACHINE

Alfred E. Carlile, Meadville, Pa., assignor to Talon, Inc., a corporation of Pennsylvania Application March 15, 1952, Serial No. 276,767

7 Claims. (Cl. 154—42)

This invention relates to a machine for bonding or sealing of sheets and films of thermoplastic material by the use of a solvent, solvent mixture, or softening agent for the thermoplastic material.

In the manufacture of articles, such as raincoats, shower curtains, garment bags, and the like, made of relatively thin sheets or films of thermoplastic resin materials, such as vinyl resins, it is necessary to unite the edges of two or more films or sheets. It has been the general practice to unite these marginal edges by sewing and forming seams by means of thread by the use of a conventional sewing machine. In such practice, the needle would penetrate the edge of the material thereby weakening the same and distorting the material, and the results were not satisfactory.

Various types of sealing or bonding machines have been suggested and used usually employing heat and a solvent agent but these machines were not satisfactory primarily because they were too expensive, bulky, and difficult to operate. Also, such machines were limited in the types of material that could be united thereby.

It is the general object of the present invention to provide an improved sealing or bonding machine which is simple and inexpensive in its construction and operation and, at the same time, efficient and effective in its use.

It is another object of the invention to provide a sealing or bonding machine having means arranged therewith for concurrently feeding, folding, and applying a binding strip to a plurality of superposed plies of material.

It is a further object of the invention to provide a sealing or bonding machine having an improved means incorporated therewith for applying a solvent automatically to a binding strip or the plies of material to be bound as they pass into and through the machine.

It is still another object of this invention to provide means for regulating the flow of the solvent material from the applying means so that the proper amount of solvent is evenly applied to the binding strip or plies of material.

It is a more specific object of the invention to provide means in the form of a pair of jets for applying a solvent to a binding strip or plies of material as they pass therealong having means arranged therewith for automatically stopping the flow of the solvent therefrom when the feed of the binding strip or plies of material into and through the machine is arrested.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

Fig. 2 is a front elevational view, partly in section, of the head of my machine;

Fig. 3 is an enlarged sectional view, partly in section, taken on line 3—3 of Fig. 2;

Fig. 4 is a sectional view taken on line 4—4 of Fig. 3;

Fig. 5 is an end view of the head and associated mechanism, as shown in Fig. 2;

Fig. 6 is an enlarged sectional view taken on line 6—6 of Fig. 2;

Fig. 7 is a sectional view taken on line 7—7 of Fig. 3;

Fig. 8 is a sectional view taken on line 8—8 of Fig. 3;

Fig. 9 is a sectional view taken on line 9—9 of Fig. 8;

Fig. 10 is a fragmentary plan view showing the binding strip and the plies of material to be bound thereby; and Fig. 11 is a cross sectional view of the bound plies of material or seam.

Figure 1:
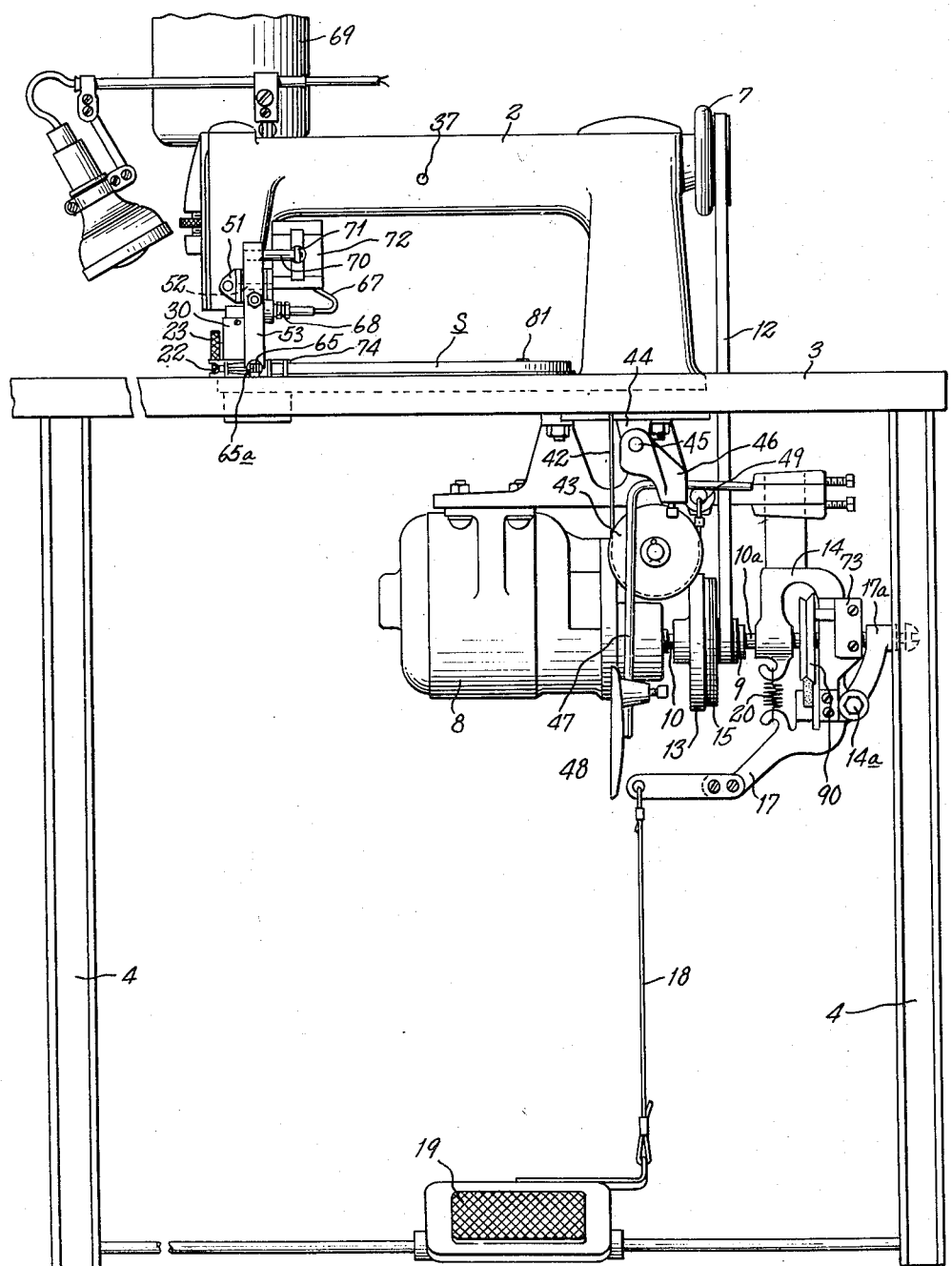
Fig. 1 is a front elevational view of the improved machine of the present invention.

Referring more particularly to the drawings, the improved machine of my invention, as more clearly shown in Figs. 1 and 2, comprises a hollow gooseneck frame 2 similar to the head or frame of a conventional sewing machine which is mounted upon a suitable table top 3 having supporting legs 4. Within the head, there is arranged in suitable bearings 5 carried thereby, a main drive shaft 6 having a combined pulley and hand wheel 7 arranged on the inner end thereof at the outer side of the frame. The pulley 7 may be connected to any suitable source of power for rotating the shaft 6, but in the present instance there is provided an electric motor 8 mounted on the under side of the table top 3 for driving this shaft 6 having a shaft 10 with a friction clutch 13 arranged therewith.

Directly opposite the end of the shaft 10, there is arranged in suitable bearings carried by a yoke-shaped bracket 14, a reciprocable shaft 10a having a clutch plate 15 arranged on the inner end thereof and a pulley 9 over which a belt 12 is arranged which passes over the pulley 7 of the shaft 6. There is pivotally attached to the yoke-shaped member 14, as at 14a, a lower extending movable arm 17 to which one end of a strap or rod 18 is connected at the outer end thereof. The upper end of the arm 17 is connected to the shaft 10a, as at 17a, for manipulating the same. The opposite end of the strap or rod 18 is connected to a foot treadle 19 for manually actuating the clutch through the movement of the shaft 10a. The clutch is normally maintained in an inoperative position so as not to rotate the shaft 6 unintentionally by means of a spring 20 extending between the yoke-shaped member 14 and the arm 17.

As more clearly shown in Figs. 2 and 5 of the drawings, in the base or bed of the frame or head 2, there is arranged in suitable bearings carried thereby a horizontally disposed shaft 21 having a knurled pressure roll 22 arranged on the outer end thereof which is disposed directly opposite a similar knurled pressure roll 23 disposed directly thereabove and with which it cooperates in a manner to be described hereinafter. The opposite end of the shaft 21 is connected to the main drive shaft 6 through suitable gearing, including bevel gears 24 and 25, vertical shaft 26, and bevel gears 27 and 28.

The pressure roll 23 is mounted on the outer end of a stud shaft 29 which is suitably journaled in a reciprocable supporting member 30 mounted in a suitable slideway in the outer lower end of the frame 2. This pressure roll 23 is driven by the main shaft 6 and connected thereto by means of bevel gears 31 and 32, vertical shaft 33, and bevel gears 34 and 35.

Within the upper part of the frame 2, there is arranged next to the main drive shaft 6 therein substantially parallel thereto, a lever-like member 36 which is pivoted to the frame 2 intermediate its length, as at 37. The outer end of this member 36 is loosely connected to a collar 38 arranged on the upper end of a sleeve-like member 39 arranged around the vertical shaft 33. The reciprocable member 30 is secured to the lower end of this sleeve-like member 39, as at 40. There is arranged circumferentially around the sleeve-like member 39, a compression spring 41 for normally maintaining the head 30 in its lowermost position with the pressure roll 23 carried thereby in contact with the pressure roll 22.

To the opposite end of the lever-like member 36, there is connected a chain or other suitable flexible member 42 which passes down through the inner end of the housing or frame 2 and around a pulley 43 suitably mounted for rotation below the table top 3. There is suitably mounted on the under side of the table top 3, a bracket member 44 to which there is pivotally attached, as at 45, a lever-like member 46. There is carried by the member 46, a downwardly extending adjustable member 47 on which there is mounted adjacent the lower end thereof a knee action lift member 48. The chain 42 is disposed around the pulley 43 and the end of the chain is attached to the lever-like member 46, as at 49, as shown in Fig. 1.

According to the present invention, and as more clearly shown in Figs. 2, 5, and 6, there is mounted on the front side of the frame 2 at the outer end thereof, a bracket member 51 to which there is pivotally attached, as at 52, a movable member 53 which has a fluid passageway 54 arranged in the lower end thereof which communicates with a passageway 55 in a housing 56 mounted on the lower end of the member 53. In this housing 56 at the inner end thereof, there is arranged a pair of jets 57 and 58 having passageways 59 and 60, respectively, which communicate with the passageway 55 in the housing.

There is arranged within the passageway 55, a pair of plunger-like pin members 61 and 62 having reduced end portions 63 and 63a, respectively, which cooperate with the respective passageways 59 and 60 in the jets 57 and 58 for a purpose and in a manner to be described. The opposite ends of the plunger-like members 61 and 62 extend out through the outer end of the housing 56 and are connected to yoke-like member 64a which in turn is pivotally connected, as at 64, to a link member 65 which in turn is connected, as at 65a, to the bed of the frame 2. There is disposed between the yoke-like member 64a and the outer side of the housing 56, a coil spring member 66 for normally maintaining the jets 57 and 58 in their innermost position, as shown in Fig. 6, for a purpose to be described. The upper end of the passageway 54 is connected by a passageway to one end of a pipe line 67, as at 68, and the other end of this pipe line 67 being connected to a suitable reservoir 69 suitably mounted on top of the frame 2 which reservoir contains a suitable bonding fluid.

With the upper end of the pivotal member 53, there is arranged an outwardly extending arm-like member 70 which is connected to the plunger 71 of a solenoid 72 mounted on the frame 2 of the machine below the upper arm thereof, as shown in Figs. 1 and 2. The actuation of this solenoid is controlled by a micro switch 73 arranged opposite the side of a disk-like member 90 which is mounted on the shaft 10a on the under side of the table top 3. The plunger of this micro switch 73 contacts the side of the member 90, and the opening and closing thereof is controlled by the sidewise movement of the shaft 10a which in turn is controlled by the action of the foot treadle 19, as shown in Fig. 1.

As more clearly shown in Figs. 2, 3, and 4 of the drawings, directly opposite the lower end of the member 53, there is mounted on top of the bed of the machine, a combined folding and guide member 74 for guiding the flexible binding strip S into and through the machine. This guide member 74 has a flat leading planar surface 75 which gradually terminates in an arcuate or curved surface 76. Along the leading planar surface, there is arranged a pair of guide strap members 77 which tend to guide and hold the binding strip against the planar surface of the guide member as it passes therealong.

There is also disposed opposite the surfaces of the guide member 74, a spring-like member 78 which tends to hold the binding strip against the surface of the guide member adjacent the jets 57 and 58. The outer end surface 79 of the guide member 74 is arranged angularly and is positioned directly opposite the inner edges of the pressure rolls 22 and 23, and has a concave surface 80 arranged therein which terminates in a plane parallel to the passage of the binding strip S between the pressure rolls 22 and 23, as shown in Figs. 3 and 9.

There is positioned below the pivotal connection 52 of the member 53, an adjustable stop 92 for limiting the inward movement of the member 53 together with the jets 57 and 58 carried thereby. Between the upper end of the member 53 and the solenoid plunger 71, there is arranged an adjustable link 93 for adjusting the movement of the member 53 in its opposite direction about its pivotal connection at 52.

The improved machine of my invention operates in the following manner. A roll of binding tape or strip S is provided and positioned preferably on a pin 81 on the bed of the machine, as shown in Figs. 1 and 2. The leading end of the strip is then threaded along the side of the folding and guide member 74 between the outer side or planar surface 74 thereof and the strap members 77, and along the arcuate or curved surface 76 in under the spring member 78, and thence back along the curved surface 80 at the end of the guide and folding member 74 and between the pressure rolls 22 and 23 with the strip being folded upon itself when it is positioned between the pressure rolls. In such position, it will be seen that the strip is positioned directly opposite the pair of jets 57 and 58 and in position for the solvent to be applied thereto as the strip passes along the planar surface 75 of the guide member 74, as shown in Figs. 3 and 6.

The motor is then energized and the machine is now ready to operate. It will be understood that when the machine is not in operation, the valve 91 in the line 67 from the reservoir 69 to the member 53 is normally closed so as to prevent the flow of the solvent or fluid from the reservoir to the jets 57 and 58 and opened when the machine is set in operation. When the motor 8 is energized, the solenoid 72 is simultaneously energized thereby moving the member 53 about its pivotal connection at 52 so as to move the jets 57 and 58 to their retracted position away from the guide 74. In such position, it will be seen that the reduced portions 63 and 64 of the plungers 61 and 62, respectively, are disposed in the passageways 59 and 60 of the jets 57 and 58, respectively, so as to prevent the flow of the solvent or liquid from the jets 57 and 58. Also, in such position, it will be seen that the jets 57 and 58 are spaced from and out of contact with the binding strip S.

The edges of the two plies of material P and P' that are to be bound together are placed directly opposite the pressure rolls 22 and 23 between the fold of the strip S, as shown in Fig. 8. The foot treadle 19 is then pressed downwardly so as to actuate the clutch 13 whereby the main shaft 6 is rotated through the action of the clutch 13 and the pressure rolls 22 and 23 are rotated in opposite directions by means of the various gears and shafts previously described. When the pressure rolls are set in motion, it will be seen that the binding strip S is pulled thereby through the machine together with the two superimposed plies of material positioned between the fold of the strip.

When the foot treadle 19 is pressed downwardly by the operator, it will be seen that the shaft 10a is moved to the left, as shown in Fig. 1, thereby moving the clutch plate 15 into engagement with the opposing member 13 of the clutch through the action of the flexible member 18 and the arm 17 against the action of the spring 20. When the shaft 10a is moved to the left, the disk-like member 90 which is secured thereto moves therewith thereby opening the micro switch 73 positioned adjacent thereto which in turn opens the circuit to the solenoid 72 thereby de-energizing the same. Upon de-energization of the solenoid, the plunger 71 thereof moves outwardly and the member 53 is moved about its pivotal connection 52 by means of the spring 66 thereby moving the jets 57 and 58 inwardly against the strip S, as shown in Fig. 6, and in position to apply the solvent or fluid thereto.

As the pressure rolls 22 and 23 pull the binding strip S therebetween, it will be seen that it is continuously drawn from the roll of tape positioned on the pin 81 and is moved between the outer surface of the combined guide and folding member 74 and the jets 57 and 58 which are disposed directly opposite the guide member. As the strip moves along the guide member, the two spaced-apart rows F and F' of solvent fluid are applied to the one side of the binding strip by means of the jets 57 and 58 with the fluid passing from the chamber 55 in the housing 56 into and through the passageways 59 and 60 to the surface of the strip, as shown in Figs. 6 and 10 of the drawings. The binding strip is folded by the combined guide and folding member 74 at the end thereof in its continuous passage to the pressure rolls 22 and 23. Immediately before the binding strip passes between the rolls, the two plies of material P and P' to be bound together are positioned in the fold of the strip S and the binding strip together with the two plies of material pass between the rolls and the two plies of material are securely bound together by the binding strip, as shown in Fig. 11 of the drawings.

Then the binding operation is completed, or when it is desired to arrest the disposition of the solvent or fluid on the strip S and to stop the binding operation, the pressure on the foot treadle 19 is relieved whereby the clutch 13 becomes disengaged thereby stopping the rotation of the pressure rolls 22 and 23. When the pressure on the treadle 19 is relieved, the shaft 10a is moved to the right, as shown in Fig. 1 of the drawings, due to the action of the spring 20 with the disk member 90 carried by the shaft cooperating with the micro switch 73 to close the same. When the micro switch is closed, the circuit to the solenoid 72 is closed thereby so as to energize the solenoid. Upon energization of the solenoid, the plunger 71 thereof is drawn inwardly thereby moving the disk member 53 about its pivotal connection 52 to its retracted position. In such position, the reduced end portions 63 and 64 of the plungers 61 and 62, respectively, enter the passageways 59 and 60 of the jets 57 and 58, respectively, thereby closing these passageways so as to prevent any flow of the solvent or fluid therefrom, as shown in Fig. 3. In such position, it will be seen that the outer ends of the jets 57 and 58 are again spaced from the strip S. This arrangement for closing the jets 57 and 58 so as to prevent any leakage of the solvent or fluid therefrom when the machine is not in operation is one of the most important aspects of the present invention.

As a result of my invention, it will be seen that there is provided a simple and inexpensive machine for joining together sheets or plies of a thermoplastic material which can be conveniently maintained and operated. It will also be seen that there is incorporated with my machine an effective means for preventing unintentional flow of the solvent fluid when the machine is not in operation. In my machine, it will be seen that an even amount of the solvent fluid is disposed on the binding strip or plies of material thereby resulting in a neat and effective bond.

While I have shown and described an embodiment which my invention may assume in practice, it will be understood that this embodiment is merely for the purpose of illustration and description, and that other forms may be devised

What I claim as my invention is:

1. In a machine of the class described, a pair of oppositely disposed rotatable rollers, means for delivering and guiding the edges of plies of material into and between said rollers, means for driving said rollers, at least a pair of jets for applying a fluid material to the surface of at least one ply of material adjacent the edge thereof, a plunger arranged within each of said jets for preventing unintentional flow of fluid material therefrom when the driving means is arrested, and means moving the jets relative to said plungers so as to permit the fluid material to pass through said jets to said material when said driving means is in operation and driving said rollers.

2. In a machine of the class described, a pair of oppositely disposed rotatable rollers, means for delivering and guiding a binding strip into and between said rollers, means for driving said rollers, a guide positioned forwardly of said rollers for guiding the strip into and between said rollers including means for folding the strip upon itself as it passes therebetween, at least a pair of jets arranged opposite said guide and which cooperate therewith to wipe a fluid material on one side of said strip as it passes therealong, a plunger arranged within each of said jets for preventing unintentional flow of the fluid material therefrom, and means for moving said jets relative to said plungers so as to permit the flow of the fluid material therefrom when said driving means is in operation and driving said rollers.

3. A machine of the class described comprising a pair of oppositely disposed rotatable rollers, a rotatable shaft for driving said rollers, means for driving said shaft, means for guiding the edges of plies of material into and between said rollers, at least a pair of jets for applying a fluid material to one side of the surface of at least one ply of material adjacent the edge thereof as it passes therealong, a reservoir for supplying the fluid material to said jets, a plunger arranged within each of said jets for preventing unintentional flow of the fluid material therefrom, means for actuating said plungers and for moving them to a retracted position simultaneously with the arresting of said driving means and the rotation of said rollers.

4. A machine of the class described, as defined in claim 3, wherein the means for actuating said plungers and for moving them to a retracted position simultaneously with the arresting of said driving means consists of a solenoid.

5. In a machine of the class described, a pair of oppositely disposed rotatable rollers, means for delivering and guiding the edges of plies of material into and between said rollers, means for driving said rollers, at least a pair of jets for applying a fluid material to the edge of at least one ply of material, a movable member in which said jets are mounted, means for actuating said movable member so as to position the jets in contact with the surface adjacent the edge of a ply of material as it passes along said guide and for moving the jets to a retracted position away from said guide and said ply of material.

6. In a machine of the class described, the construction as defined in claim 5, including a stationary plunger arranged within each of said jets for preventing unintentional flow of the fluid material therefrom; said movable member adapted to move said jets relative to said plungers upon actuation thereof by said actuating means.

7. In a machine of the class described, a pair of oppositely disposed rotatable rollers, means for delivering and guiding the edges of plies of material into and between said rollers, means for driving said rollers, at least a pair of jets for applying a fluid material to the surface adjacent the edge of at least one ply of material, a pivotally mounted member, a pair of jets carried by said member communicating with a fluid passageway therein, a stationary plunger arranged within each of said jets for preventing unintentional flow of the fluid material therefrom, a reservoir for said fluid material, a conduit connecting said reservoir with the passageway in said pivoted member, and means for actuating said pivoted member so as to position the jets in contact with the surface of the ply of material as it passes along said guide and for moving the jets to a retracted position relative to said plungers.

ALFRED E. CARLILE.

References Cited in the file of this patent

UNITED STATES PATENTS

| Number | Name | Date |
|---|---|---|
| 2,343,975 | Hosfield | Mar. 14, 1944 |